United States Patent [19]

Enochs et al.

[11] Patent Number: 4,936,646

[45] Date of Patent: Jun. 26, 1990

[54] TEMPERATURE-COMPLIANT TUBE FOR FIBER OPTIC COMPONENTS

[75] Inventors: Raymond S. Enochs, Hillsboro; Randy S. Randall, Beaverton, both of Oreg.

[73] Assignee: Tektronix, Inc., Beaverton, Oreg.

[21] Appl. No.: 397,209

[22] Filed: Aug. 23, 1989

[51] Int. Cl.⁵ .............................................. G02B 6/42
[52] U.S. Cl. .................................................. 350/96.20
[58] Field of Search ............... 350/96.15, 96.17, 96.18, 350/96.20; 357/17, 19, 74, 30; 250/227

[56] References Cited

U.S. PATENT DOCUMENTS

| | | | |
|---|---|---|---|
| 4,119,363 | 10/1978 | Camlibel et al. | 350/96.20 |
| 4,413,881 | 11/1983 | Kovats | 350/96.20 |
| 4,615,031 | 9/1986 | Eales et al. | 350/96.20 X |
| 4,695,125 | 9/1987 | Sinclair et al. | 350/96.20 |
| 4,802,178 | 1/1989 | Ury | 350/96.20 X |
| 4,803,361 | 2/1989 | Aiki et al. | 250/227 |

FOREIGN PATENT DOCUMENTS 0164583 10/1982 Japan .................. 350/96.17

Primary Examiner—John D. Lee
Attorney, Agent, or Firm—Francis I. Gray; Peter J. Meza

[57] ABSTRACT

A temperature-compliant tube for fiber optic components is inserted into the exit port of an hermetically sealed package and extends into the interior of the package. An optical fiber extends through the temperature-compliant tube and is attached to a substrate interior of the package for coupling to an optical component mounted on the substrate. The optical fiber is hermetically sealed to the interior end of the temperature-compliant tube. The thermal coefficients of expansion and lengths for the temperature-compliant tube, the optical fiber between the substrate and the interior end of the tube, and the package body between the substrate and the exterior end of the exit port are tailored to provide zero differential expansion to enable the fiber optic components to be cycled over a wide temperature range without misalignment of the fiber relative to the optical component or mechanical failure of the fiber.

2 Claims, 1 Drawing Sheet

TEMPERATURE-COMPLIANT TUBE FOR FIBER OPTIC COMPONENTS

BACKGROUND OF THE INVENTION

The present invention relates to temperature compensation, and more particularly to a temperature-compliant tube for fiber optic components that compensates for the difference in thermal expansion coefficients between a package and an optical fiber connecting an internal component to an external point.

Fiber optic components, such as laser diode sources and photodiode optical receivers, are limited in their operating and storage temperature range, at least in part, by thermal expansion mismatch between the optical fiber and package body material. Expansion mismatch typically results in fiber-to-component misalignment and/or fiber breakage when components are repeatably heated from room temperature to above 100 degrees centigrade. Both effects render the component useless. As shown in FIG. 1 an optical component, such as a laser diode or photodiode, is mounted on a substrate within a package. An optical fiber is aligned with the optical component and is attached at "A", such as by soldering, welding, adhesive bonding or the like. The fiber exits the package through an exit port and is soldered into the tube at "B". The fiber is metallized and the solder at "B" provides a hermetic seal for the package. The thermal coefficient of expansion for the fiber is approximately 0.5E-6 in/in/degC, and the package body is typically fabricated of a metal having a thermal coefficient of expansion of approximately 6.0E-6 in/in/degC. When the temperature is raised the change in length of the package between points "A" and "B" exceeds that of the fiber. As a result the fiber is put in tension and the solder joint at "A" may yield, causing misalignment of the fiber with the optical component. If the elastic limit of the fiber is exceeded, the fiber may even break between "A" and "B".

Therefore it is desired to extend the temperature range within which the fiber/package combination may be exposed without misalignment or breakage of the fiber.

SUMMARY OF THE INVENTION

Accordingly the present invention provides a temperature-compliant tube for fiber optic components that adds an insert tube within an exit port of a package body. The insert tube extends into the package body to reduce the length of constrained fiber, and has a thermal coefficient of expansion greater than that of the package body. The expansion of the insert tube compensates for the expansion of the package body relative to the fiber to produce a "zero stress" condition at elevated temperatures.

The objects, advantages and other novel features of the present invention are apparent from the following detailed description when read in conjunction with the appended claims and attached drawing.

DESCRIPTION OF THE PREFERRED EMBODIMENT

Figure 1:
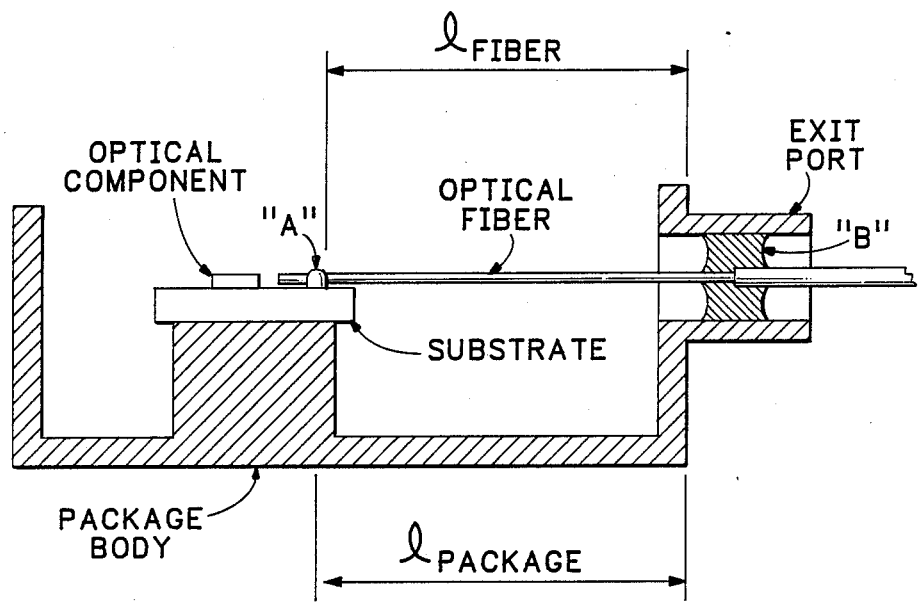
FIG. 1 is a cross-sectional view of a prior art mechanical configuration for coupling an optical fiber to an optical component within a package body.
Figure 2:
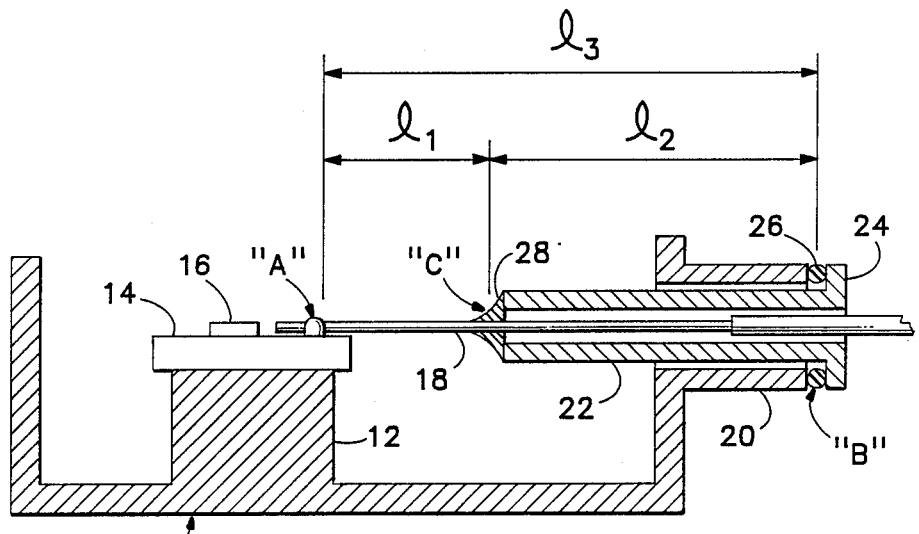
FIG. 2 is a cross-sectional view of a mechanical configuration using a temperature-compliant tube for coupling an optical fiber to an optical component within a package body according to the present invention.

Referring now to FIG. 2 a package body 10 is shown having a pedestal 12 upon which is mounted a substrate 14. On the substrate 14 is mounted an optical component 16, such as a laser diode or a photodiode. An optical fiber 18 enters the package body 10 through an exit port 20 and is attached to the substrate 14 at point "A" by any suitable means, such as soldering. An insert tube 22 also is inserted through the exit port 20 and extends into the interior of the package body. The exterior end 24 of the insert tube 22 is in the form of a flange that is hermetically, fixedly attached to the outer end 26 of the exit port 20 at point "B". The fiber 18 is contained within the insert tube and hermetically affixed at point "C" to the interior end 28 of the insert tube, such as by soldering, welding, adhesive bonding or the like.

The insert tube 22 is fabricated from a metal having a thermal coefficient of expansion greater than that of the package body to offset the expansion of the package relative to the fiber. Zero differential expansion, and thus zero stress on the fiber and the attachment point "A", is achieved by tailoring the actual length of the mechanical elements and their thermal expansions. The zero stress condition is given by the expression:

$$a_1 * l_1 + a_2 * l_2 = a_3 * l_3$$

where $a_n$ are the thermal coefficients of expansion for the respective elements, and $l_n$ are the respective lengths of the elements. As shown in FIG. 2 $l_1$ is the restrained length of the fiber 18 between points A and C, with a corresponding coefficient $a_1$; $l_2$ is the length of the insert tube 22 between points B and C, with a corresponding coefficient $a_2$; and $l_3$ is the overall length of the package body 10 between points A and B, with a corresponding coefficient $a_3$. The result is to enable the optical package with attached fiber to be cycled over a wide temperature range without causing strain-induced fiber-to-optical component misalignment or mechanical failure of the fiber. This is achieved while still maintaining a hermetic exit port construction.

Thus the present invention provides a temperature-compliant tube for coupling an optical fiber to an optical component within a hermetically sealed package, the tube having a temperature coefficient of expansion greater than that of the package body to compensate for the differential in temperature coefficients of expansion between the optical fiber and the package body, and thus to produce zero stress on the fiber at the coupling point.

What is claimed is:

1. An improved optical package of the type having an optical component mounted on a substrate within a package body, and having an optical fiber entering the package through a hermetically sealed exit port having an exterior end for attachment to the substrate to couple the optical fiber to the optical component, the improvement comprising an insert tube having an interior end that extends into the package body through the hermetically sealed exit port and through which the optical fiber extends, the optical fiber being hermetically attached to the interior end of the insert tube and the insert tube being fabricated of a material having a thermal coefficient of expansion to compensate for the difference in thermal coefficients of expansion between the package body and the optical fiber.

2. An improved optical package as recited in claim 1 wherein the thermal coefficients of expansion are related to each other by the relationship $$a_1 * l_1 + a_2 * l_2 = a_3 * l_3$$

where $a_1$ is the thermal coefficient of expansion for the optical fiber, $a_2$ is the thermal coefficient of expansion for the insert tube, $a_3$ is the thermal coefficient of expansion for the package body, $l_1$ is the length of the optical fiber from the substrate attachment point to the interior end of the insert tube, $l_2$ is the length of the insert tube, and $l_3$ is the length of the package body from the substrate attachment point to the exterior end of the exit port.

* * * * *